Aug. 28, 1962 F. R. ROGERS 3,050,941
FUEL CONTROL APPARATUS FOR A COMBUSTION ENGINE
Filed Oct. 6, 1958
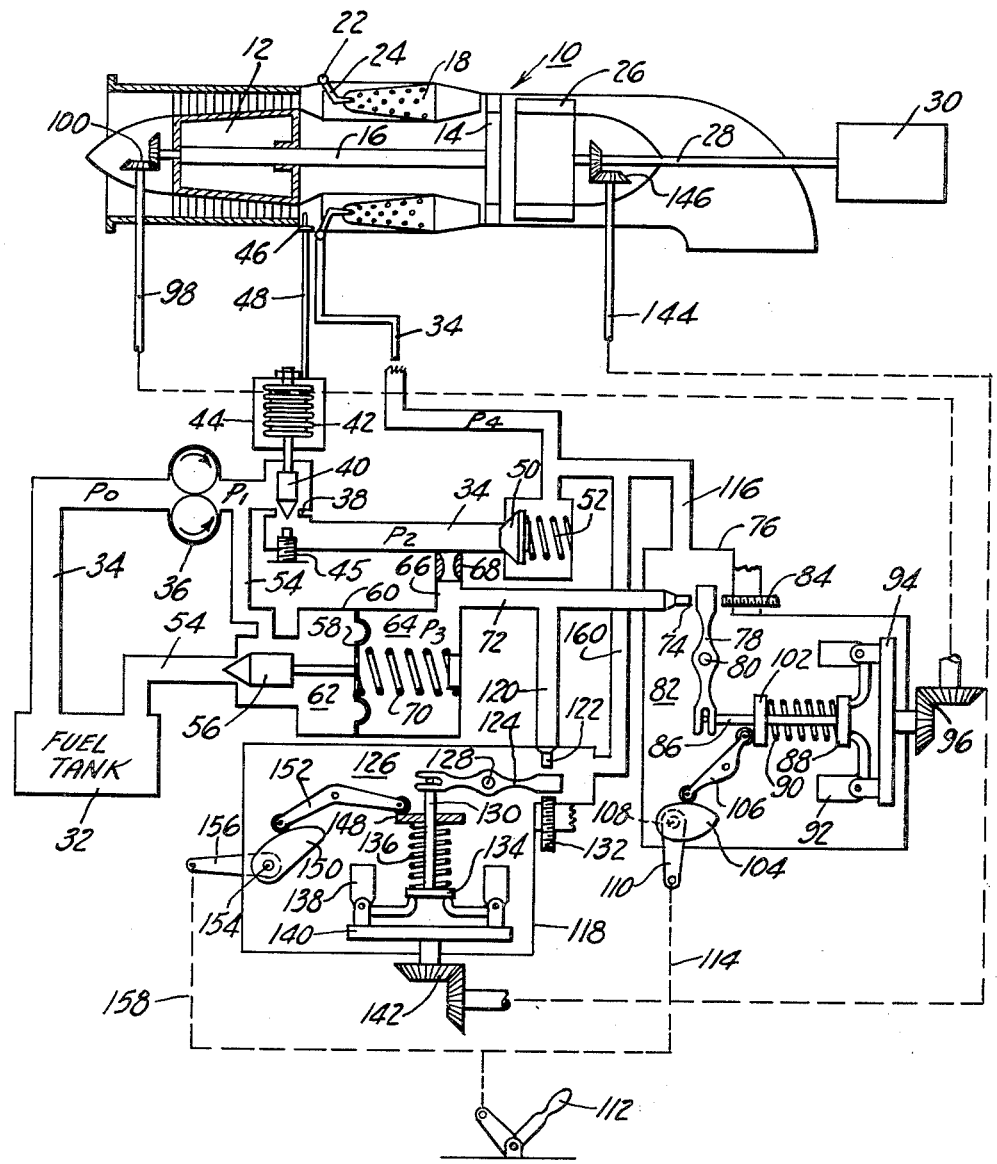
INVENTOR.
FRANCIS R. ROGERS
BY Cecil F. Arens
ATTORNEY """
United States Patent Office 3,050,941
Patented Aug. 28, 1962

3,050,941
FUEL CONTROL APPARATUS FOR A COMBUSTION ENGINE
Francis Reed Rogers, South Bend, Ind., assignor to The Bendix Corporation, a corporation of Delaware
Filed Oct. 6, 1958, Ser. No. 765,651
4 Claims. (Cl. 60—39.28)

The present invention relates to a fuel supply system for a combustion engine, and more particularly to apparatus for controlling the rate at which fuel is supplied to a gas turbine engine having one or more separately rotatable turbines.

It is an object of the present invention to provide improved control apparatus for controlling the supply of fuel to a gas turbine engine having a by-pass valve controlled by a plurality of governor mechanisms.

It is another object of the present invention to provide improved control apparatus for controlling the supply of fuel to a combustion engine having a plurality of independently rotatable turbines.

It is another object of the present invention to provide improved and simplified fuel control means to reduce the complexity and increase the reliability of a fuel supply system for a combustion engine.

Other objects and advantages will become apparent from the following description and accompanying drawing wherein a sectional view of combustion engine and apparatus for controlling the supply of fuel to said combustion engine is shown in accordance with the present invention.

Referring to the drawing, there is shown a combustion engine 10, including a compressor 12, a first turbine 14, and a drive shaft 16 connected between said compressor and said turbine. A plurality of combustion chambers 18 are provided and are supplied fuel from a common fuel manifold 22 through individual fuel lines 24 and nozzles 20. The engine further includes a second turbine 26 located in the tailpipe of the engine and which is mechanically connected through a drive shaft 28 to an external load device 30 which is illustrative of any well known power absorbing means such as a fixed pitch propeller, a variable pitch propeller, a generator, automotive transmission or the like.

Associated with engine 10 is control apparatus for supplying fuel to manifold 22, including a fuel supply tank 32 and a main fuel supply conduit 34 which is connected to tank 32 on one end and to the manifold 22 on the other. A fuel pump 36 is located in conduit 34 and is operative to receive a low pressure fuel, designated as $P_0$ from tank 32, and pressurize said fuel, such that the fuel pressure in conduit 34 at the outlet of pump 36 is relatively high in value and is represented by the symbol $P_1$. Downstream of pump 36 there is located in conduit 34 a fixed size orifice 38 and a metering valve 40 operative in association with said orifice to vary the effective size thereof as a function of the axial movement of valve 40. Metering valve 40 is fixedly secured to the movable end of an evacuated bellows 42 which is secured interiorly at one end to housing 44. The housing 44 contains air pressure generated by the compressor 12 of combustion engine 10 which is transmitted by pressure sensing device 46 and conduit 48. As fuel in conduit 34 passes through the variable restriction formed by opening 38 and metering valve 40, the fuel pressure is reduced and is designated as $P_2$ pressure. The minimum closure position of valve 40 is externally adjustable by means of adjustable stop 45 threadedly secured to the valve housing. A pressurizing valve 50 is positioned in conduit 34 downstream of opening 38 and is biased in a closed direction by compression spring 52. The spring 52 is designed in rate and in initial compression load so that the pressure drop across valve 50 is substantially constant. The decreased pressure fuel in conduit 34 downstream of valve 50 is designated as $P_4$.

A conduit 54 connects the outlet of pump 36 with the supply tank 32. A valve 56 is operative with conduit 54 to control the supply of fuel passing through to tank 32, and this is indirectly operative to control the quantity of fuel permitted to pass from pump 36 to opening 38 in conduit 34. A diaphragm 58 is secured at its outer edge to a housing 60 to form two chambers 62 and 64 within said housing. The center or movable portion of said diaphragm is secured to valve 56 such that any movement of said diaphragm will cause axial movement of valve 56. Chamber 62 contains $P_1$ pressure fuel obtained from conduit 54, said fuel communicates with one face of diaphragm 58 tending to move it and valve 56 to the right or in a direction to permit increased fuel flow to supply tank 32. Conduit 66 containing restrictive orifice 68 is operative to transmit fluid from conduit 34 downstream of opening 38 to chamber 64 where it acts over the other face of diaphragm 58 producing a force tending to move valve 56 to the left or in a valve closing direction. The above mentioned valve closing force is augmented by the force produced by compression spring 70 which is contained between diaphragm 58 and housing 60. The pressure of fuel in chamber 64 is designated as $P_3$. A force analysis of diaphragm 58 under steady state or balanced conditions produces the following relationship:

$$P_1 A = P_3 A + F$$

where A is the area of said diaphragm and F is the force due to spring 70. Dividing the equation by A and transposing $P_3$ produces:

$$P_1 - P_3 = F/A$$

The force output of spring 70 is designed to be substantially constant for the operative range of movement of valve 56 such that the force F is substantially constant. Thus the equation may be re-expressed:

$$P_1 - P_3 = K$$

where K is a constant. Any force unbalance across diaphragm 58 will move valve 56 in a direction to correct the unbalance. For example, should $P_3$ tend to decrease valve 56 will move to the right by passing more fluid to tank 32 and decreasing $P_1$ fluid acting on diaphragm 58 tending to rebalance it. An increase in $P_3$ would move valve 56 to the left and increase $P_1$ to again establish the relationship:

$$P_1 - P_3 = K$$

Variations in $P_1$ pressure fluid are correctable in a like manner. Conduit 72 communicates with conduit 66 downstream of restriction 68 and terminates with a fixed size opening within a first governor housing 76. A lever 78 is pivotably secured by shaft 80 and is operative with the opening 74 to control the flow of $P_3$ fuel from conduit 72 to chamber 82 formed by the housing 76. Clockwise movement of lever 78 is limited by stop member 84 threadedly secured in the housing 76, while counterclockwise movement of said lever is limited by contact with rigid conduit 72. Lever 78 engages axially movable rod 86 by a forked connection on one end thereof. Rod 86 includes a larger diameter member 88 which is loaded on one side by compression spring 90 and on the other by flyweight members 92. Flyweights 92 are pivotably secured to a spin table 94 which is connected to turbine 14 through bevel gears 96, shaft 98, bevel gears 100, compressor 12, and a shaft connecting said compressor and turbine 14. Spring 90 is held by axially movable retainer 102 which is positioned in response to the contour on cam 104 by pivotably secured cam follower 106. Cam 104 is secured to shaft 108 which extends externally through housing 76 where it is engaged by control lever 110.

Lever 110 is in turn connected to throttle member 112 by means of any well known mechanical connection represented by the dashed line 114. Fuel in housing 76, obtained from conduit 72, is transmitted by conduit 116 to the main fuel supply conduit 34 at a point containing $P_4$ pressure fuel. A second governor housing 118 is also supplied $P_3$ fuel by means of branch conduit 120 which is connected to conduit 72. A fixed opening 122 of conduit 120 is operative with the lever 124 to control the flow of fuel into the chamber 126 formed by housing 118. Lever 124 is pivotably secured to shaft 128 and engages by means of a forked connection, axially movable shaft 130. Angular movement of lever 124 is limited in a clockwise direction by means of stop member 132 threadedly secured in housing 118, and the angular movement in a counterclockwise direction is limited by contact of lever 124 with conduit 120. Rod 130 includes a larger diameter portion 134 which is loaded on one side by the force applied by compression spring 136 and on the other by the force produced by flyweight members 138. The flyweight members 138 are pivotably secured to the spin table 140 which is connected to turbine 26 by means of bevel gears 142, shaft 144, bevel gears 146, and shaft 28 of the engine 10. One end of compression spring 136 contacts axially movable retainer 148 and is moved in response to the contour of cam member 150 by pivotably secured cam follower 152. Cam 150 is secured to shaft 154 which extends externally from housing 118 where it is engaged by a control lever 156 which in turn is connected to throttle 112 by means of any well known or mechanical connection as represented by dashed line 158. Fuel contained in housing 118 is returned to conduit 34 by means of conduit 160 at a point containing $P_4$ pressure fuel.

Operation

The apparatus illustrated in the present disclosure meters fuel to manifold 22 by controlling the effective area of orifice 38 by means of valve 40 and by controlling the pressure differential across said orifice by means of by-passing valve 56. Thus by controlling orifice size and pressure differential the rate or flow of fuel passing through said orifice is determined. In the present invention bellows 42 is exposed to a compressor generated pressure by means of sensing device 46. As the pressure increases bellows 42 is compressed which retracts valve 40 away from orifice 38 and increases the flow of fuel to manifold 22. The rate of fuel flow to manifold 22 may also be varied by movement of governor levers 78 and 124 which will change the pressure differential across orifice 38 in the following described manner. As the $P_3$ fuel leakage is increased through either port 74 or 122 as when the port controlling levers 78 and 124 are rotated clockwise, the pressure of $P_3$ fuel in chamber 64 would tend to decrease. However, valve 56 and diaphragm 58 are operative, as previously described, to maintain the pressure differential across diaphragm 58 constant by varying the flow rate of fuel returning to supply tank 32 and through orifice 38. Thus any tendency for $P_3$ pressure to decrease and upset the balance across diaphragm 58 will be corrected by movement of valve 56 to the right which decreases the fuel flow and pressure differential at orifice 38. Closure of ports 74 or 120 would cause an increase in the pressure differential across orifice 38 in a similar manner. The apparatus of the present invention can best be described by a consideration of its operation during a typical cycle of operation. Assume for example, that throttle 112 is positioned in a relatively low performance position and engine 10 is operating under steady state or equilibrium conditions such as would be the case when the fuel supplied to manifold 22 and combustion chambers 18 is just sufficient to produce enough power to maintain a constant speed of turbine 14 and compressor 12. Under the above conditions the pressure generated by compressor 12 is constant and pressure responsive bellows 42 is operative to hold valve 40 at a substantially fixed position. Cam member 102 in governor housing 76 is positioned by throttle 112 and contacts cam follower 106 at a point of low cam height such that the force acting on member 88 due to compression spring 90 is relatively small. Under steady state conditions the force of spring 90 is opposed and balanced out by the force of flyweight 92 rotating at the speed of turbine 14. Lever 78 is held in a position intermediate to stop member 84 and conduit 72 thus permitting a controlled amount of leakage of $P_3$ fuel from opening 74. At the same throttle setting, cam 150, located in governor housing 118, contacts cam follower 152 at a point having intermediate cam height, such that the force produced by compression spring 136 slightly exceeds that produced by flyweight members 138 which are rotated at the speed of turbine 26. In this unbalanced condition, rod 130 is moved to its extreme downward position determined by contact of lever 124 with conduit 120, thus closing off opening 122. Under steady state operating conditions then, the governor contained in housing 118 is not operative to control $P_3$ fuel leakage from chamber 64. Assume now, however, that throttle 112 is positioned to its maximum performance position, which rotates cams 104 and 150 to positions where they contact their respective cam followers at points having increased cam rise. Spring 136 is further compressed thus producing an increased force holding lever 124 against opening 122. Spring 90 is also compressed and unbalances the governor, moving rod 86 to the right and positioning lever 78 against opening 74. Leakage of $P_3$ fluid from chamber 64 is stopped increasing the pressure differential across orifice 38 and thus increasing the fuel flow to manifold 22. The increased flow of fuel to engine 10 is in excess of that needed to maintain a steady state speed such that the speed of the turbines of said engine begin to accelerate. Compressor 12 increases in speed with turbine 14 thus producing an increased pressure which is sensed by bellows 42 and withdraws valve 40 from opening 38 permitting a progressively increasing flow of fuel to engine 10. Spin tables 94 and 140 increase in rotative speed with their respective turbines thus causing flyweights 92 and 138 to produce more force. Engine 10 will continue to accelerate and bellows 42 will continue to withdraw from opening 38 until the increasing force produced by flyweights 92 begins to again balance out the force of spring 90 and move lever 78 away from opening 74. $P_3$ fuel leakage from chamber 64 will increase permitting valve 56 to move to the right and allow more fuel to be by-passed to tank 32. Valve 56 will continue to move until turbine 14 quits accelerating and assumes a new steady state speed where the force produced by flyweights 92 balances out that of spring 90. If it is desired to return engine 10 to the first assumed condition where a relatively low level of performance is required, throttle 112 may be returned to its original position. The effective height of cams 150 and 104 is reduced to its original value and the compression force of springs 136 and 90 reduced. Under this condition the force output of flyweights 138 and 92 exceed that of the respective compression springs thus causing levers 124 and 78 to move clockwise until they encounter stops 132 and 84. Openings 122 and 74 therefore are opened to their widest position permitting maximum $P_3$ fuel leakage from chamber 64 moving by-pass valve 56 to the right. Movement of valve 56 to the right increases the flow of fuel back to supply tank 32 and decreasing the flow of fuel through conduit 34 to the engine 10 below the flow necessary to maintain steady state operation. Turbines 14 and 26 thus begin to decelerate and the pressure produced by compressor 12 is reduced allowing bellows 42 to expand and reduce the effective area of opening 38 which further reduces the rate of fuel flow to engine 10. Deceleration will continue at a rapid rate until the force produced by flyweights 138 decreases sufficiently so that it is less than the force produced by spring 136 whereupon lever 124 will move counterclockwise and obstruct the flow of $P_3$ fuel from opening 122 and reduce the rate at which engine 10 decelerates. Further deceleration reduces the force output of flyweights 92 to a point where lever 78 moves away from stop 84 and begins to close off opening 74. $P_3$ leakage decreases and further moves valve 56 to the left until the engine 10 quits decelerating and stabilizes out at its original steady state condition.

In the above operating cycle it was assumed that the acceleration was relatively moderate. When it is desired to actuate throttle 112 from a minimum to a maximum performance setting in a relatively short time interval it is possible that turbine 26 might tend to overspeed. In such an event flyweights 138 are designed so as to overcome the force of spring 136 at a predetermined overspeed and open opening 122 so that $P_3$ leakage increases and the fuel delivered to engine 10 is reduced.

Although the instant invention has been disclosed with a certain degree of particularity, it should be understood that various changes in the form, arrangement of parts, and substitution of equivalents may be made without departing from the scope or spirit of the present invention.

I claim:

1. In a fuel supply system for a combustion engine having a compressor and a compressor driving turbine, the combination of a fuel source, a main conduit interconnecting said fuel source and the engine, engine driven pump means disposed in said main conduit to pressurize the fuel therein, a metering valve defining a variable restriction in said main conduit disposed intermediate said pump and the engine, a pressurizing valve positioned in said main conduit in series flow relationship therewith downstream of said metering valve, a by-pass conduit connected on one end to said main conduit intermediate said pump and said metering valve and on the other end to said fuel source, a by-pass valve operative with said by-pass conduit to control the rate of fuel being returned to said fuel source, a movable pressure responsive member connected to said by-pass valve to control the fuel controlling position thereof in response to pressures acting on opposed sides, first means communicating fuel from said main conduit intermediate said pump and said metering valve to one side of said pressure responsive member in a direction urging said by-pass valve in flow increasing direction, second means containing a flow limiting bleed member therein for communicating fuel from said main conduit intermediate said metering valve and said pressurizing valve to the other side of said pressure responsive member urging said by-pass valve in a flow decreasing direction, a flow passage connected to said last named means downstream of said bleed member on one end and said main conduit downstream of said pressurizing valve on the other, and governor means responsive to turbine speed operative to control the fuel flow through said flow passage and vary the pressure acting on said other side of said pressure responsive member.

2. In a fuel supply system as claimed in claim 1 wherein said pressurizing valve is operative to produce a substantially constant pressure drop thereacross.

3. In a fuel supply system as claimed in claim 1 including engine compressor pressure responsive means connected to said metering valve to define said variable restriction in response to engine compressor pressure.

4. In a fuel supply system as claimed in claim 1 wherein said engine has a plurality of turbines and said governor means is comprised of a plurality of governors each responsive to the speed of separate engine turbines.

References Cited in the file of this patent

UNITED STATES PATENTS

| | | |
|---|---|---|
| 2,604,756 | Greenland | July 29, 1952 |
| 2,649,686 | Lawrence | Aug. 25, 1953 |
| 2,720,752 | Chandler et al. | Oct. 18, 1955 |
| 2,741,089 | Jagger | Apr. 10, 1956 |
| 2,761,280 | Atkinson | Sept. 4, 1956 |
| 2,785,848 | Lombard et al. | Mar. 19, 1957 |
| 2,848,869 | Russ | Aug. 26, 1958 |
| 2,986,126 | Werts | May 30, 1961 |

FOREIGN PATENTS

| | | |
|---|---|---|
| 1,140,459 | France | Mar. 4, 1957 |